United States Patent

[11] 3,618,998

[72] Inventor Donald A. Swauger
 20616 Blackhawk St., Chatsworth, Calif. 91311
[21] Appl. No. 28,654
[22] Filed Apr. 15, 1970
[45] Patented Nov. 9, 1971

[54] WINDLOAD APPLICATOR AND STABILIZER FOR STEERABLE FRONT WHEELS OF REAR-ENGINED VEHICLES
 8 Claims, 5 Drawing Figs.
[52] U.S. Cl...................................................... 296/1 S, 280/150 R
[51] Int. Cl...................................................... B62d 37/00
[50] Field of Search............................................ 296/1 S; 180/1 FV; 280/150, 150 C, 150 D

[56] References Cited
UNITED STATES PATENTS
2,036,560 4/1936 Backus.......................... 296/1 S Primary Examiner—Benjamin Hersh
Assistant Examiner—Winston H. Douglas
Attorney—Leslie M. Hansen ABSTRACT: In an airfoil windload applicator for automatically increasing traction between the tires of the steerable front wheels of a rear-engined vehicle and the pavement in increments dependent upon acceleration of speed of such vehicle relative thereto an airfoil member pivotally mounted adjacent and relative to a flat pan bottom and spring loaded means for supporting the airfoil member at a normally raised position, but yieldable for increased inclination and greater downward pressure of such tires upon the pavement.

PATENTED NOV 9 1971  3,618,998

INVENTOR.
DONALD A. SWAUGER
BY
Leslie M. Hansen
HIS ATTORNEY.

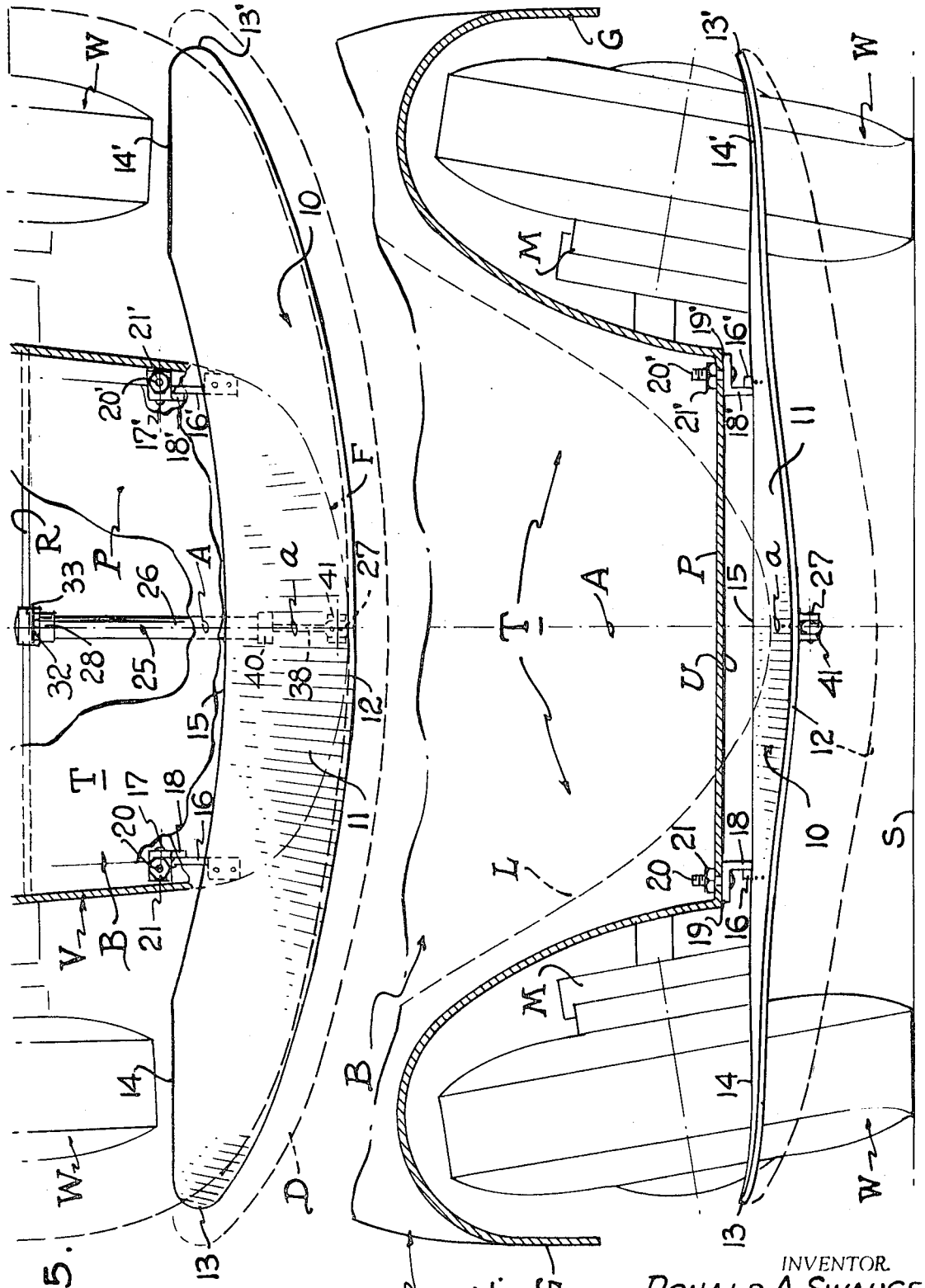

WINDLOAD APPLICATOR AND STABILIZER FOR STEERABLE FRONT WHEELS OF REAR-ENGINED VEHICLES

BACKGROUND

This invention relates to airfoil stabilizers for small rear-engined vehicles and more particularly to a windload applicator therefor.

Since the instruction of lightweight, compact rear-engined vehicles it has become a problem for a driver thereof to control steering especially at high speeds. As is well known such vehicles have a trunk-type fore-end with a completely closed bottom. Turbulent air currents rushing under such vehicle between the closed bottom and the pavement tend to lift the front wheels resulting in light traction and difficulty in controlling steering. The vehicle known as a VOLKSWAGON is especially vulnerable to such difficulty in steering, especially at high speeds. This is due to lack of weight up front and the general character of the vehicle's solid bottom pan construction being subjected to an uplift by wind forces passing beneath the vehicle.

Numerous attachments have been made to provide an airfoil beneath the front end of such vehicles to create a reduced pressure area thereunder at high speeds in an attempt to force the front wheels more firmly down upon the pavement. All of the prior known airfoil attachments have been of a type fixed between the front wheels of the vehicle. In other words, such known airfoils remain at a fixed angular disposition and depend solely upon the wind speed to create the downward thrust.

THE PRESENT INVENTION

The present invention contemplates the provision of an airfoil and mount therefor by which to achieve automatic changes in angular disposition of the airfoil dependent upon airspeed. It is an object of the present invention to provide an airfoil and mount therefor by which the airfoil assumes various positions of inclination as the speed of vehicle increases.

In this connection it will be appreciated that the airfoil remains relatively ineffective during city driving or in heavy traffic. However, when driving at higher speeds on a freeway or expressway the airfoil automatically assumes an angular disposition to enhance the traction of the steerable front wheels relative to the pavement.

It is another object to provide an airfoil conforming to the width of the vehicle and the contour of the front bumper of the vehicle during parking or normal and slow speed operation of the vehicle. In this object it is contemplated that the airfoil be hingedly supported and spring-loaded by a mechanism calculated to yield to wind pressures applied to the airfoil.

These and other objects and advantages of the present invention will become apparent from a reading of the following description in the light of the accompanying two sheets of drawing in which:

FIG. 4 is a front elevational view of the airfoil of FIGS. 1 and 2, the vehicle being sectionally disclosed; and FIG. 5 is a plan view of FIG. 4 showing the airfoil and parts of the vehicle associated therewith.

GENERAL DESCRIPTION

Figure 1:
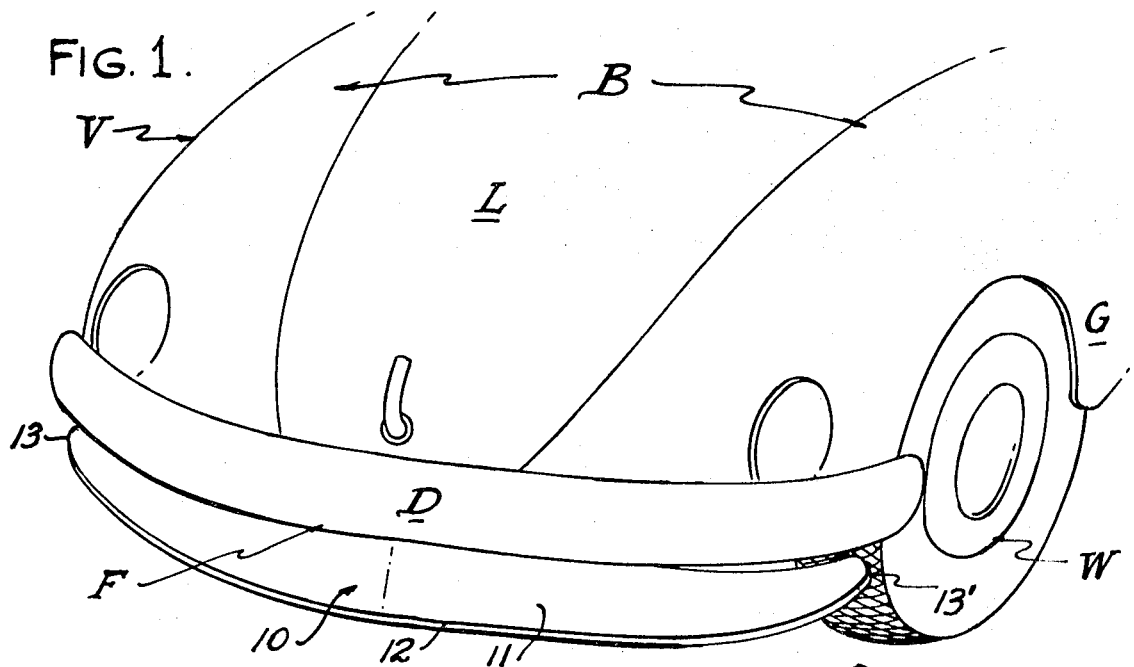
FIG. 1 is a fragmentary perspective view of the front end of a vehicle having the airfoil of the present invention mounted thereon.

Referring to the drawings the rear engine vehicle V depicted is that of the "VOLKSWAGON" manufacture. It is with a vehicle of such design and characteristics that the present invention is best adapted for use. The vehicle V has a body B provided with a hinged lid L at its fore end F for gaining access to a truck T within the body. The vehicle V has a pan-type bottom P which usually spans the entire length and width of the body. The trunk T is disposed between the two front wheels W which are coupled to a steering mechanism M controlable from the drivers's compartment in a conventional manner. A tie bar or rod R extends across the body B beneath the pan P in a zone between the two front wheels W. A bumper D is supported in a conventional manner on brackets (not shown) across the front end F of the body B in a plane comparable to that of the bottom pan P usually at the axle level of the wheels W. As best seen in FIGS. 4 and 5 the trunk T is formed between front fenders or mud guards G which are symmetrical to the longitudinal axis A of the vehicle.

It is due to this solid bottomed body B that air flowing into the space between the bottom pan P and the surface S of the highway that the front end of the vehicle is lifted slightly off of the pavement. This reduces traction of the tires on the pavement and induces faulty steerability of the vehicle at high speeds.

DETAILED DESCRIPTION

The present invention seeks to overcome the unstable condition created by airflow under the front, steerable end of such a vehicle by the provision of a self-adjusting airfoil 10 therefor.

The airfoil 10 comprises a flat vanelike member 11 of solid material such as pressed wood, MASONITE and/or aluminum contoured in a particular manner. As best illustrated in FIGS. 1 and 5 the member 11 has a forward edge 12 conforming substantially to the curvature of the front bumper D of the vehicle V. The member 11 is of a length to span the width of the vehicle V such that the extreme ends 13 and 13' of the member 11 are adapted to be disposed just ahead of the front wheels W of the vehicle V. The extreme ends 13–13' preferably have a straight back edge 14–14', respectively in the zone of the front wheels W and a concaved back edge 15 between them is somewhat parallel to the curvature of the forward edge 12.

The member 11 is symmetrically formed relative to an axis—a—transverse to its width and adapted to be disposed in a plane congruent to the longitudinal axis A of the vehicle V. The member 11 is attached to the vehicle V by means of a pair of brackets 16–16' each secured equidistant sidewise from the axis—a—-16' are pivotally connected as at 17–17' to the depending arm 18–18', respectively, of an angle bracket 19–19' having a bolt 20–20' extending upwardly therefrom. The bolts 20–20' are adapted to extend upwardly through holes provided in the chassis and bottom pan P of the vehicle V and are secured thereto by a nut 21–21', respectively. It should here be noted that vehicles of the "VOLKSWAGON" manufacture already have such holes existing and ready to receive the bolts 20–20'. The member 11 is thus supported adjacent the underside U of the vehicle pan P for articulation about the axis of the pivotal connections 17–17' between the brackets 16–19 and 16'–19' respectively.

Figure 2:
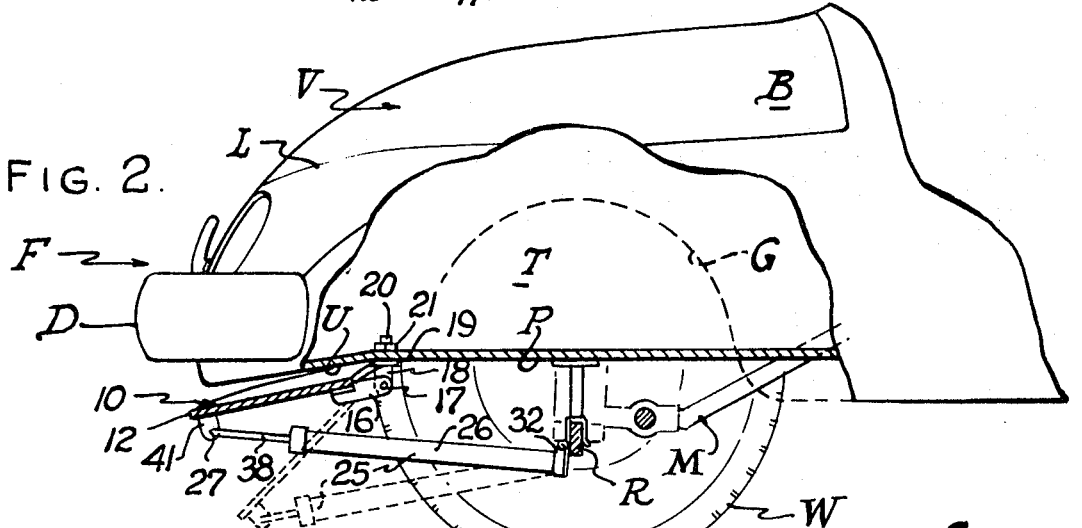
FIG. 2 is a side elevation of FIG. 1; partially in section for purpose of illustration.

Means 25 is provided for yieldably supporting the airfoil member 11 in a normally raised position adjacent the underside U of the bottom pan P of the vehicle to which it is attached. The yieldable means 25 is a spring loaded ram 26 having its one end 27 pivotally connected to the member 11 and its opposite end 28 pivotally connected to a fixed portion of the vehicle rearwardly of the fore end F thereof. In the present disclosure such a fixed portion is provided by the tie bar or rod R which extends across the body B beneath the pan P and between the two front wheels W as shown in FIGS. 2, 3 and 5.

Figure 3:
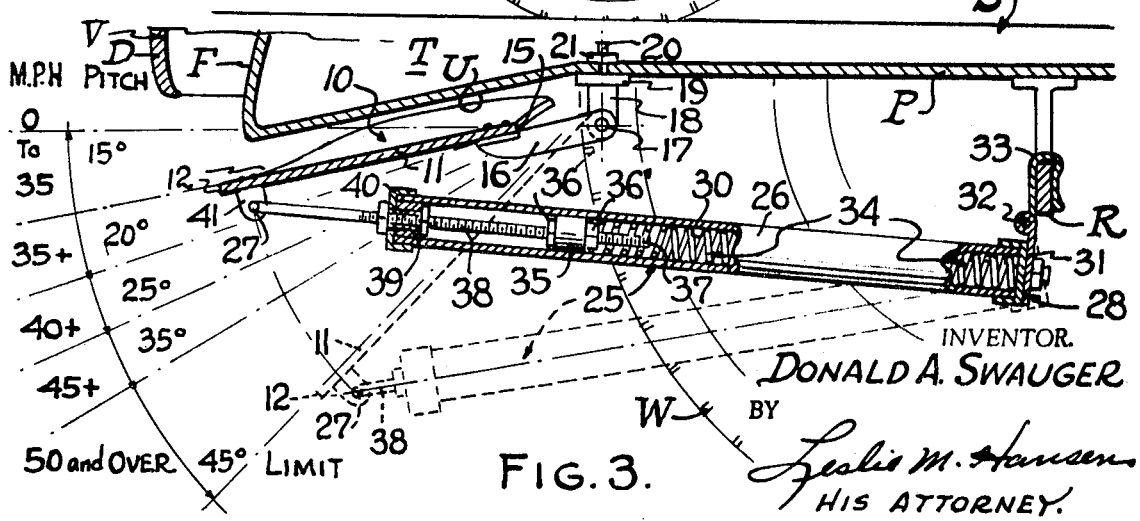
FIG. 3 is an enlarged detail section centrally of FIG. 1 and that portion of FIG. 2 related to the airfoil.

The spring loaded ram 26 of the yieldable means 25 preferably comprises a cylindrical body 30 having its after end 28 closed by a cap secured to one wing 31 of a hinge 32 the opposite wing 33 of which consists of a spring clip adapted to be fastened over the tie bar R as best seen in FIG. 3. A compression spring 34 is arranged in the cylinder with its aft end based against the capped end 28. The fore end of the spring 34 bears against a plug 35 which is guided piston fashion within the cylinder 30. The plug 35 is secured between a pair of nuts 36–36' on the threaded end 37 of a push rod 38. The rod 38 is guided for sliding movement concentrically of the cylinder 30 through a Teflon sleeve 39 suitably secured to cap 40 on the fore end of the cylinder 30. The rod 38 has its opposite or free end pivotally connected as at 27 to a trunnion bracket 41 adjacent the forward edge 12. The bracket 41 is secured to the underside of the member 11 along its axis—a —which is midway the pivotal connections 17' between the member 11 and the vehicle V.

As previously mentioned the airfoil member 11 is normally supported in a raised position adjacent the underside U of the bottom pan P of the vehicle. This is accomplished by the compressive strength of the spring 34 and angular disposition of the ram 26 between the member 11 and the fixed portion R of the vehicle. In the present disclosure the compression spring 34 is calculated to exert a thrust of approximately 25 pounds per square inch. As best illustrated in FIG. 3 the normal disposition of fore-end of the airfoil member 11 is approximately 15° below horizontal, i.e. the plane of the bottom pan P of the vehicle V.

Under normal drive conditions within city limits and in traffic at speeds from zero to 35 miles per hour the member 11 is disposed to remain in normally raised position as above explained. However, as the speed of the vehicle is increased a wind load is exerted against the member 11. It should here be noted that normally the major 15° inclination of the member 11 is along its transverse axis—a—, the forward edge 12' rising slightly to either side toward the extreme ends 13–13' of the airfoil member 11. Thus it will be appreciated that the oncoming air created by a windload against the airfoil 10 is pocketed at center between the member 11 and the underside U of the vehicle V. Therefore, as the speed of the vehicle is increased beyond 35 miles per hour the pressure of the oncoming air is scooped up centrally of and against the airfoil it counteracts the thrust of the spring loaded ram 26. Therefore when the speed of the vehicle reaches 35 miles per hour the spring 34 yields, but only to the extent of holding the member 11 at an inclination of approximately 20° below horizontal at a speed just over 35 miles per hour. Correspondingly with each increment of speed the angular disposition of the fore-end of the airfoil 11 increases in inclination below horizontal until the yieldability of the spring 34 reaches a limit, wherein the fore-end of the airfoil is at a limit of approximately 45° relative to the horizontal. The ranges of speed in miles per hour in relation to the inclination of the airfoil in degrees below horizontal are exemplified in FIG. 3. This is by way of example only and as noted from actual experience on an average number of installations in which the airfoil 10 of the present invention has been applied. Suffice it to say that the arrangement is such as to afford automatic changes in inclination of the airfoil relative to and below horizontal dependent upon changes in speed of the vehicle to which the airfoil is applied.

This automatic increase in inclination of the airfoil member commensurate with acceleration of the vehicle results in a downward thrust on the airfoil which presses the front end of the vehicle toward the pavement. Accordingly this increases the downward pressure of the front tires against the pavement resulting in better and greater traction between the steerable front wheels as the speed of the vehicle is increased. Not only is the steering of the more stabilized, but braking action thereof is enhanced due to the increase in traction between the tires of the two front wheels relative to the pavement. Moreover wind sway normally experienced with such rear engined vehicles due to passing trucks or caused by crosswinds on expressways and freeways is less likely to happen and the wind sway is practically eliminated by reason of the increase in traction at the front steerable wheels.

While the foregoing adjustable wind load applicator airfoil has been explained in specific detail it will be appreciated by those skilled in the art that the same may be altered, modified and/or varied without departing from the spirit of my invention therein as called for in the following claims.

What I claim as new and desire to protect by Letters Patent is:

1. A windload applicator for the solid pan-bottomed truck front end of a rear engined vehicle for urging the front steerable wheels thereof toward pavement and comprising:
    a. an airfoil
    b. means adjacent the aft-end of the airfoil for pivotally mounting said airfoil on the solid pan-bottomed front end of such vehicle and transversely the longitudinal axis of such vehicle; and
    c. yieldable means for supporting said airfoil in varying positions ranging from a normal position of slight inclination relative to the solid pan bottom front end of the vehicle to a lower limit of inclination of approximately 45° relative to the solid pan bottom front end of the vehicle and adapted to yield upon application of windloads to said airfoil whereby the latter assumes increments in inclination from said normal position to said lower limit of inclination as the speed of travel of said vehicle increases.

2. The windload applicator in accordance with that of claim 1 in which said airfoil comprises:
    a flat elongated member symmetrically formed on each side of a transverse axis thereof disposed congruent to the longitudinal axis of such vehicle and having a forward edge depressed at such transverse axis and curving upwardly toward terminal ends for providing a pocketlike recess at such transverse axis for scooping air toward center of said airfoil.

3. The windload applicator in accordance with that of claim 2 in which said terminal ends are upturned slightly and extend equidistant laterally from such transverse axis thereof toward a position forwardly of the front steerable wheels of such vehicle.

4. The windload applicator in accordance with that of claim 2 in which said means for pivotally mounting said airfoil comprises:
    a. a pair of brackets secured to said airfoil member in spaced relation equidistant from the transverse axis of the latter and extending rearwardly thereof:
    b. an angle clip having a depending leg pivotally connected to the rearward extension of each of said brackets;
    c. bolt means on each of said angle clips adapted to extend upwardly through holes provided in the solid pan bottomed front end of the vehicle; and
    d. nut means within the trunk of the vehicle for securing said bolts to said solid pan-bottomed trunk.

5. The windload applicator in accordance with that of claim 4 in which said yieldable means comprises:
    a. a pressure-regulated cylinder having its after end hingedly connected to a fixed portion of the vehicle rearwardly of the front end thereof,
    b. a piston and piston rod guided within said cylinder with such piston rod extending forwardly of said cylinder; and
    c. means adjacent the forward edge of said airfoil member for pivotally connecting the free end of said piston rod thereto.

6. The windload applicator in accordance with that of claim 2 in which said yieldable means comprises:
    a. a pressure-regulated cylinder having its after end hingedly connected to a fixed portion of the vehicle rearwardly of the front end thereof;
    b. a piston and piston rod guided within said cylinder with such piston rod extending forwardly of said cylinder; and
    c. means adjacent the forward edge of said airfoil member for pivotally connecting the free end of said piston rod thereto.

7. The windload applicator in accordance with that of claim 6 in which said means for pivotally mounting said airfoil comprises:
    a. a pair of arms secured to said airfoil member in spaced relation equidistant from the transverse axis of the latter and extending rearwardly thereof;

b. a pair of brackets secured to the solid pan-bottomed trunk front of such vehicle and pivotally connected to the rearward extension of each of said arms on an axis transverse to the longitudinal axis of such vehicle.

8. The windload applicator in accordance with that of claim 7 in which said yieldable means comprises a spring means confined within said cylinder between the hinged end thereof and the piston therein.

* * * * *